(12) United States Patent
Philipskötter et al.

(10) Patent No.: US 7,628,573 B2
(45) Date of Patent: Dec. 8, 2009

(54) SELF-PIERCING RIVET

(75) Inventors: Andre Philipskötter, Everswinkel (DE); Johannes Eckstein, Sindelfingen (DE); Michael Ruther, Rottenburg (DE); Herbert Wältz, Schloss Holte (DE); Roland Porepp, Crinitz (DE)

(73) Assignee: Bollhoff Verbindungstechnik GmbH, Bielefeld (DE)

( * ) Notice: Subject to any disclaimer, the term of this patent is extended or adjusted under 35 U.S.C. 154(b) by 338 days.

(21) Appl. No.: 11/591,705

(22) Filed: Nov. 2, 2006

(65) Prior Publication Data

US 2007/0104553 A1 May 10, 2007

(30) Foreign Application Priority Data

Nov. 2, 2005 (DE) .................. 10 2005 052 360

(51) Int. Cl.
*F16B 19/08* (2006.01)
(52) U.S. Cl. .................................................. 411/501
(58) Field of Classification Search ............ 411/500, 411/501, 504
See application file for complete search history.

(56) References Cited

U.S. PATENT DOCUMENTS

| | | | | |
|---|---|---|---|---|
| 2,302,772 | A * | 11/1942 | Huck | 411/501 |
| 4,609,315 | A * | 9/1986 | Briles | 411/43 |
| 5,332,349 | A * | 7/1994 | Gerwin | 411/507 |
| 5,651,172 | A * | 7/1997 | Auriol et al. | 29/512 |
| 5,671,521 | A * | 9/1997 | Briles | 29/407.05 |
| 6,325,584 | B1 * | 12/2001 | Marko et al. | 411/501 |
| 6,338,601 | B1 * | 1/2002 | Mauer et al. | 411/503 |
| 6,662,911 | B1 * | 12/2003 | Nugier | 188/250 G |
| 6,663,329 | B2 * | 12/2003 | Singh et al. | 411/501 |
| 6,763,568 | B1 * | 7/2004 | Mauermann et al. | 29/432.2 |
| 7,464,452 | B2 * | 12/2008 | Yamamoto et al. | 29/505 |
| 2004/0068854 | A1 | 4/2004 | Kato et al. | |
| 2008/0232930 | A1 * | 9/2008 | Jokisch | 411/501 |

FOREIGN PATENT DOCUMENTS

| | | |
|---|---|---|
| DE | 4431 769 A1 | 9/1994 |
| DE | 200 01 103 U1 | 1/2000 |
| DE | 2003 19 610 U1 | 4/2004 |

(Continued)

*Primary Examiner*—Flemming Saether
(74) *Attorney, Agent, or Firm*—Seyfarth Shaw LLP

(57) ABSTRACT

A self-piercing rivet of a special rivet geometry is described, which in particular is suitable for joining high strength steel sheets, but can also be used for other metal sheets. The self-piercing rivet is in particular characterized by a special under-head geometry as well as a special geometry of the rivet foot (cutting region). Thus the self-piercing rivet has an underhead chamfer which with a radial plane of the self-piercing rivet encloses an angle of 20°+5°/−5° and merges tangentially into the cylindrical outer surface of the rivet shank via a radius. In the region of the rivet foot the self-piercing rivet has a plane shank face, which extends essentially at a right angle to the rivet axis and which merges "smoothly" into the cylindrical inner surface via a shank inner surface and a radius. In comparison to conventional self-piercing rivets the special rivet geometry enables lower joining forces and tensile forces in the joining operation, an optimized load bearing performance and an optimum joint quality of the self-piercing rivet joint as well as minimum gap formation between the rivet and the metal sheet.

20 Claims, 9 Drawing Sheets

FOREIGN PATENT DOCUMENTS

| | | |
|---|---|---|
| EP | 0 720 695 B1 | 12/1998 |
| EP | 1 064 466 B1 | 3/2002 |
| EP | 1 229 254 A2 | 8/2002 |
| EP | 1 387 093 A1 | 2/2004 |
| JP | 09-3 17 730 A | 12/1997 |
| JP | 2001 1 59 409 A | 6/2001 |
| JP | 2003-1 06 316 A | 4/2003 |

* cited by examiner

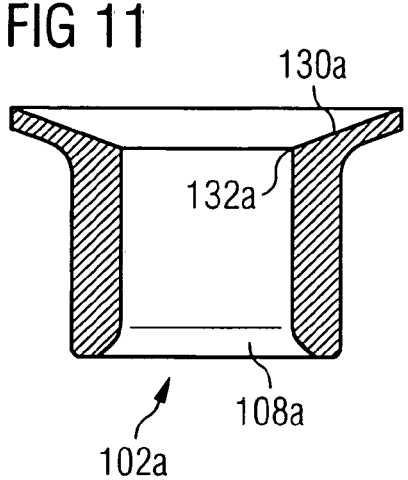
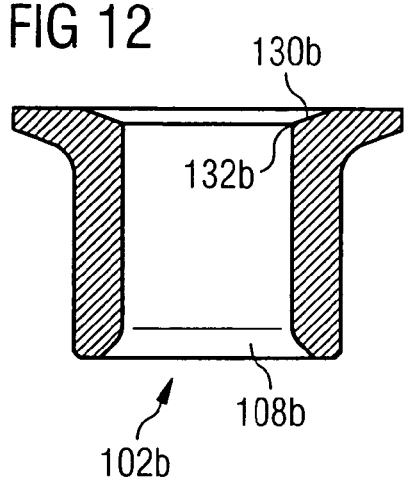
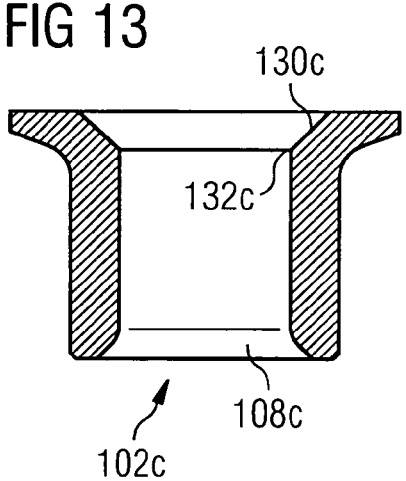
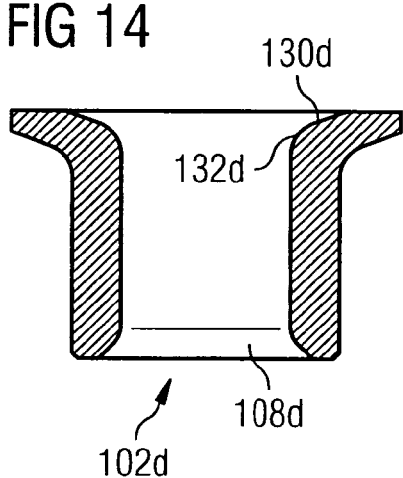
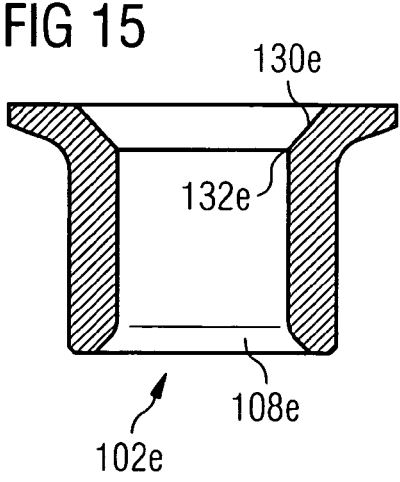

SELF-PIERCING RIVET

BACKGROUND OF THE INVENTION

The present invention relates to a self-piercing rivet in the form of a semihollow self-piercing rivet or full hollow self-piercing rivet for producing a self-piercing rivet joint between two or more metal sheets.

Self-piercing riveting as a joining method has gained increasing importance in the recent past. One important parameter for the joining operation as well as the joining quality of the self-piercing rivet joint is the geometry of the self-piercing rivet. In the state of the art numerous different geometries of the self-piercing rivet are known, see e.g. EP 0 720 695, EP 1 064 466, EP 1 229 254, EP 1 387 093, DE 44 31 769, DE 203 19 610 U1, DE 200 01 103 U1, US 2004/0068854 A1, JP 2001159409A, JP 09317730A et alia.

The self-piercing rivet according to the above named EP 0 720 695, which is normally described as a C rivet, is used on a large scale in the motor vehicle industry, but also in other technical fields. This is a semihollow self-piercing rivet with a rivet head and a rivet shank with a central shank borehole of which the rivet head has a plane top side and a cylindrical head exterior and the rivet shank has a cylindrical shank exterior and a cylindrical shank interior confining the central shank borehole. The cylindrical head exterior and the cylindrical shank exterior are directly joined to each other through a relatively large radius. In the bottom region of the self-piercing rivet the central shank hole is formed as a cone, wherein the cone flanks are supposed to be slightly curved according to the specifications in this publication. As a result of this within the framework of the given production engineering possibilities a kind of "sharp edge" is prepared on the of the rivet shank, which in practice is generally somewhat chamfered. According to the specifications in this publication the opening angle of the cone can range between 25° and 120°.

Even though the C rivet has proved to be successful in practice, it comes up against limiting factors in particular in the case of self-piercing riveting high strength sheet steel.

Thus for example an improvement with regard to the achievable joint quality and load bearing capacity of the self-piercing rivet joint, stress of the rivet during the joining operation, and gap formation between the rivet and the metal sheets would be desirable.

SUMMARY OF THE INVENTION

The present invention is based on the object of providing a self-piercing rivet for the joining of metal sheets in particular made of high strength materials, which rivet on the basis of its geometry is subject to comparatively small joining forces and tensile forces in the joining operation, provides an optimized load bearing performance and an optimized joint quality of the self-piercing rivet joint and keeps gap formation between rivet and metal sheets as low as possible.

This object is solved by the claimed self-piercing rivet.

The self-piercing rivet formed according to the invention is distinguished by the special geometry defined in Claim 1 in the underhead region as well as in the foot region. According to this the cylindrical head exterior surface and the shank exterior surface are joined by a conical underhead chamfer and an underhead radius, of which the underhead radius transitions tangentially into the underhead chamfer and the shank exterior and the conical underhead chamfer with a radial plane of the self-piercing rivet encloses an angle of $20°+5°/-5°$. In the region of the rivet bottom the shank exterior surface and the shank interior surface are joined by a plane shank face, a conical shank inside chamfer and a shank end radius, of which the shank end radius transitions tangentially into the shank interior and the conical shank inside chamfer and the plane shank face is joined with the shank exterior through a cutting edge. The plane shank face with a radial plane of the self-piercing rivet encloses an angle of $0°-3°/+3°$, and the conical shank inside chamfer with a radial plane encloses an angle of $45°+10°/-5°$.

Preferably the radial width of the plane is greater than 0.035 times the diameter of the cylindrical shank exterior and in particular ranges between 0.035 and 0.07 times this diameter. The underhead radius is preferably less than 0.30, in particular 0.15 times the diameter of the cylindrical shank exterior.

As has been demonstrated with the help of experiments and with the help of the finite element method (FEM), the self-piercing rivet constructed according to the invention has numerous advantages compared to conventional self-piercing rivets, in particular compared to the above mentioned C rivet. The special rivet geometry of the self-piercing rivet constructed according to the invention enables joint force reductions for production of the self-piercing rivet joint, an optimized piercing of the punch side metal sheets preferably for high strength steels, an adapted, uniform expansion behavior after piercing of the top sheet, so that the damage, deformation and risk of cracking in the self-piercing rivet can be significantly reduced. By means of the optimized piercing process the distribution of stresses in the rivet shank is much more homogenous than for example in the case of the C rivet. The absolute tensile forces in the rivet shank—tensile stresses on the shank interior and compressive tensile forces on the shank exterior—can be reduced, so that the stress gradient turned out to be much more uniform over the width of the shank. As a result of this feature the damage of the self-piercing rivet during the piercing process is minimized, and good conditions are created for the further setting process (expansion of the rivet, generation of the rivet head end position, re-bouncing of the metal sheets after removal of the tool).

A constant, uniform, continuous expansion of the self-piercing rivet is made possible due to the plane shank face in combination with the shank inner radius, which results in a homogenous build-up of tension in the self-piercing rivet and prevents abrupt changes of the self-piercing rivet load. The "obtuse" design of the rivet shank in the piercing region (rivet bottom region) results in the process security being increased. Furthermore it results in a two-dimensional loading of the die-side sheet and prevents the piercing through or failure of the die-side sheet.

Through the special underhead geometry the jointing forces and the joining work can be reduced, because the punch side sheet does not come into contact with the underside of the rivet head until quite late, the force required for generation of the rivet head end position is not required until quite late and the gradient in the load displacement course is comparatively great. Due to the late contact of the special underhead geometry with the punch side sheet and the rapid (characteristically short) punch stroke for generation of the rivet head end position the metal sheets are deformed the least possible amount, so that re-bouncing of the metal sheets after the joining operation turns out to be significantly lower than in the state of the art. As a result of the fact that self-piercing rivet does not expand until after the cutting through of the punch side sheet, a clean cutting edge of the punch side sheet results. After the setting process this results in an optimum contact surface of the punch side sheet on the rivet shank. This type of gap formation between rivet and sheet is thus significantly reduced by the rivet geometry according to the invention.

A comparatively large gap can form between the metal sheets in the case of the self-piercing rivet constructed according to the invention, said gap enabling a relative motion or a "setting" of the self-piercing rivet joint after removal of the tools. This has a positive effect on the re-bouncing action of the metal sheets, because the metal sheets have a kind of "freedom of motion". As potential of this gap formation a greater load bearing capacity under vibrating load is to be named, since a certain setting behavior of the metal sheets and with it the self-piercing rivet joint makes possible a better homogeneity of the tensile forces in the set joint.

A better stress distribution of the self-piercing rivet element results from the optimized setting process. The load of the self-piercing rivet during the setting process is reduced and more uniform (essentially through the optimized expansion process and the uniform expansion of the rivet), and re-bouncing of the metal sheets is minimized by the underhead geometry, so that a better self-piercing rivet quality results and an improved load bearing performance can be derived therefrom.

As an additional advantage of the of the special underhead geometry the lower distortion of the joined metal sheets is to be named, because the punch side material is not necessarily radially displaced. Undulations, which would be evoked by deformation of the metal sheets can be reduced by the very much smaller underhead radius and the punctual conctact of the rivet head on the punch side sheet.

The self-piercing rivet designed according to the invention is preferably used for the joining of sheets made of high strength steel, but can be used quite generally for the joining of sheets made of any material. The self-piercing rivet itself consists of a high strength steel, but can also be made of other common rivet materials such as special steel, aluminum, alloys of these materials, ceramic etc.

The self-piercing rivet designed according to the invention can be a semihollow self-piercing rivet (in which case the central hole is a blind hole) or a full hollow self-piercing rivet (in which case the central hole is a through bore).

Advantageous designs and further developments of the invention are defined in the sub-claims.

BRIEF DESCRIPTION OF THE DRAWINGS

With reference to the drawings embodiments of the invention will be described in greater detail. In the figures:

FIGS. 11-15 show axial sections corresponding to FIG. 10 of different embodiments of a hollow self-piercing rivet on a reduced scale.

DETAILED DESCRIPTION OF THE INVENTION

Figure 1:
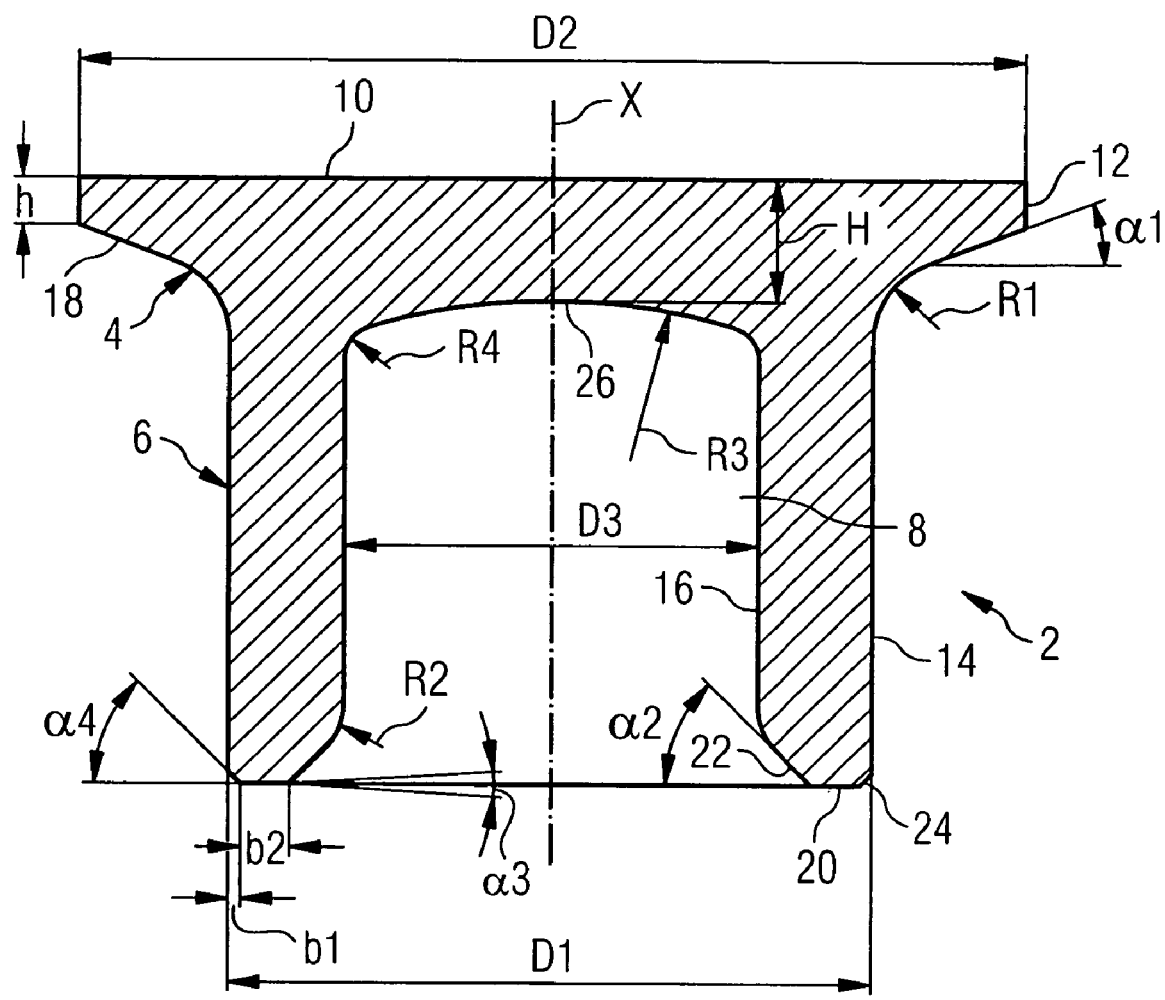
FIG. 1 shows an axial section of a semihollow self-piercing rivet designed according to the invention.

With the help of FIG. 1 a concrete embodiment of a semihollow self-piercing rivet designed according to the invention is described.

The self-piercing rivet 2 is designed rotationally symmetrical with reference to a central axis X and consists of a rivet head 4 and a rivet shank 6 with a central hole 8, which is designed as a blind hole.

The rivet head 4 has a (preferably plane) top side 10 and a (preferably cylindrical) head exterior 12. The head exterior 12 has a diameter D2 and an axial height h.

The rivet shank 6 has a cylindrical shank exterior 14 and a cylindrical shank interior 16, which bounds the hole 8. The cylindrical shank exterior 14 has a diameter D1, and the cylindrical shank interior has a diameter D3. Reference is made of the fact that the shank exterior 14, for specified application cases, can be designed slightly diverging at least in certain places in order to minimize the gap formation between the joined metal sheet sheets.

The cylindrical head exterior 12 is joined with the cylindrical shank exterior 14 via a conical underhead chamfer 18 and a radius R1. (By the term "radius" in the present scope an annular surface is to be understood, which in an axial section has the shape of a circular arc with the radius R.)

The radius R1 runs tangentially to the underhead chamfer 18 as well as to the shank exterior 14, while the underhead chamfer 18 directly adjoins the shank exterior 12 (e.g., over a radius). The underhead chamfer 18 encloses with a radial plane an angle $\alpha 1$.

In the region of the rivet bottom the shank exterior 14 is joined with the shank interior 16 via a plane shank face 20, a shank inside chamfer 22 and a radius R2, wherein between the shank exterior 14 and the plane shank face 20 a circumferentially extending cutting edge 24 is provided. The plane shank face 20 runs at a right angle to the axis X, wherein deviations to this within an angle $\alpha 3$ are permissible. The shank inside chamfer 22 is inclined toward a radial plane of the self-piercing rivet 2 under an angle $\alpha 2$. The radius R2 runs tangentially to the shank interior 16 and the shank inside chamfer 22. The plane shank face 20 has a radial width b2.

The cutting edge 24 is in the ideal case sharp-edged. In practice, however, for manufacturing reasons it can be designed as a chamfer or rounded part, which has a radial width b1. In the case of a chamfer the cutting edge 24 encloses with a radial plane the angle $\alpha 4$.

The hole 8 has a curved bottom in the region of the underhead 26, which is composed of a central radius R3 and two lateral radii R4. The lateral radii R4 run tangentially to the shank interior 16 and the radius R3. The rivet head 4 has an axial height H on the axis X.

According to the preferred exemplary embodiment the specified dimensions have the following size:

$D1 = 5.3 + 0.1/-0.1$ mm $D2 = 7.75 + 0.15/-0.15$ mm $D3 = 3.40 + 0.30/-0.00$ mm $h = 0.40 + 0.00/-0.20$ mm $H = 1.00 + 0.00/-1.00$ mm $b1 = 0.35 + 0.10/-0.15$ mm $b2 = 0.10 + 0.00/-0.1$ mm $R1 = 0.67 + 0.10/-0.10$ mm $R2 = 0.7 + 0.1/-0.1$ mm $R4 = 0.27 + 0.05/-0.05$ mm $R3 = 6.01 + 0.10/-0.10$ mm $\alpha 1 = 20° + 5°/-5°$ $\alpha 2 = 45° + 10°/-5°$ $\alpha 3 = 0° + 3°/-3°$ $\alpha 4 = 45° + 5°/-5°$ The axial length of the self-piercing rivet 2 amounts to 5 mm in the shown exemplary embodiment. However, reference is made to the fact that other rivet lengths of more or less than 5 mm used as a standard feature are also possible in the case of identical dimensions in other respects.

Special attention is to be directed to the geometry of the self-piercing rivet 2 in the rivet bottom region as well as in the region of the underhead:

As a result of the relatively small angle $\alpha 1$ of the underhead chamfer 18 and the relatively small radius R1 between the underhead chamfer 18 and the shank exterior 14 a relatively large clearance is present below the rivet head 4 outside of the rivet shank 6. The result is that during the joining process the rivet head 4 comes into contact with the punch side metal sheet relatively late and the bowing (the deflection) of the punch side metal sheet is relatively slight. In other words, there is a correspondingly low "material shrinkage" (metal sheet shrinkage).

This has an advantageous effect in numerous respects: An optimum rivet head end position results in the punch side metal sheet, which results in a corresponding "evenness" of the top side of the self-piercing rivet joint. On the basis of the late contact between underhead geometry and punch side metal sheet, the comparatively slight deformation of the punch side metal sheet—in comparison to conventional self-piercing rivets like the initially mentioned C rivet—the joint forces required for the joining operation are reduced. This in turn results in correspondingly lower tensile forces in the self-piercing rivet during the setting process, as a result of which the damage, deformation and risk of cracking are correspondingly reduced. As initially explained, the force required for generation of the rivet head end position is not required until quite late, and the gradient in the load displacement curve is comparatively great. The rivet head end position is not generated until quite late, and the generation of the rivet head end position happens relatively quickly and with a distinct increase in force.

Due to the late contact of the special underhead geometry with the punch side metal sheet and due to the rapid (characteristically short) punch stroke for generation of the rivet head end position the metal sheets are deformed the least amount possible so that the return action of the metal sheets after the joining operation turns out to be significantly lower than in the state of the art.

These and addition effects achieved by the underhead geometry are functionally connected with the effects achieved by the rivet bottom geometry:

Characteristic for the bottom geometry is the plane shank face 20, which practically lies in a radial plane of the rivet and transitions over the shank inside chamfer 20 with the special angle $\alpha 2$ and over the radius R2 in the shank interior 16. This special bottom geometry, in particular the plane shank face 20, causes a concerted guidance of the self-piercing rivet during the joining operation. As a result of this a premature expansion of the self-piercing rivet in the cutting through of the punch side metal sheet is prevented, while through the combination of 20, 22 and R2 a controlled and uniform expansion of the rivet shank 6 occurs in the case of the penetration of the rivet into the die side metal sheet (thus where the expansion is desired).

The result is a clean cutting process in the piercing of the punch side metal sheet. While it is true that the joint force required as well as the required deformation work (i.e. the energy to be applied) is not coercively reduced, the damage of the rivet is avoided to the greatest extent. Since additionally the ring area penetrating into the punch side metal sheet in unexpanded state is smaller than in expanded state (as is the case with the C rivet), there is a further reduction of the required cutting or joint forces. This in turn results in correspondingly reduced tensile forces in the self-piercing rivet. Since additionally in the cutting through of the punch side metal sheet the rivet shank is not yet expanded, only slight bending stresses occur, so that the distribution of stresses in the rivet is comparatively homogeneous (uniform) and only slight tensile and compressive stresses are present on the inside or outside of the rivet shank, so that in the ideal case only axial compressive stresses occur in the shank. As a result a premature damage of the self-piercing rivet in the joining operation is prevented, and the risk of cracking is correspondingly reduced.

A further advantage resulting in this connection consists in the fact that no open gap comes into being prematurely at the parting plane between the metal sheets, said gap which can then no longer be closed, which also results in a reduced cracking in the finished self-piercing rivet joint.

The described effects were confirmed both experimentally as well as also by the Finite Element Method (FEM), as will be explained now with the help of FIGS. 2 through 9.

Figure 2:
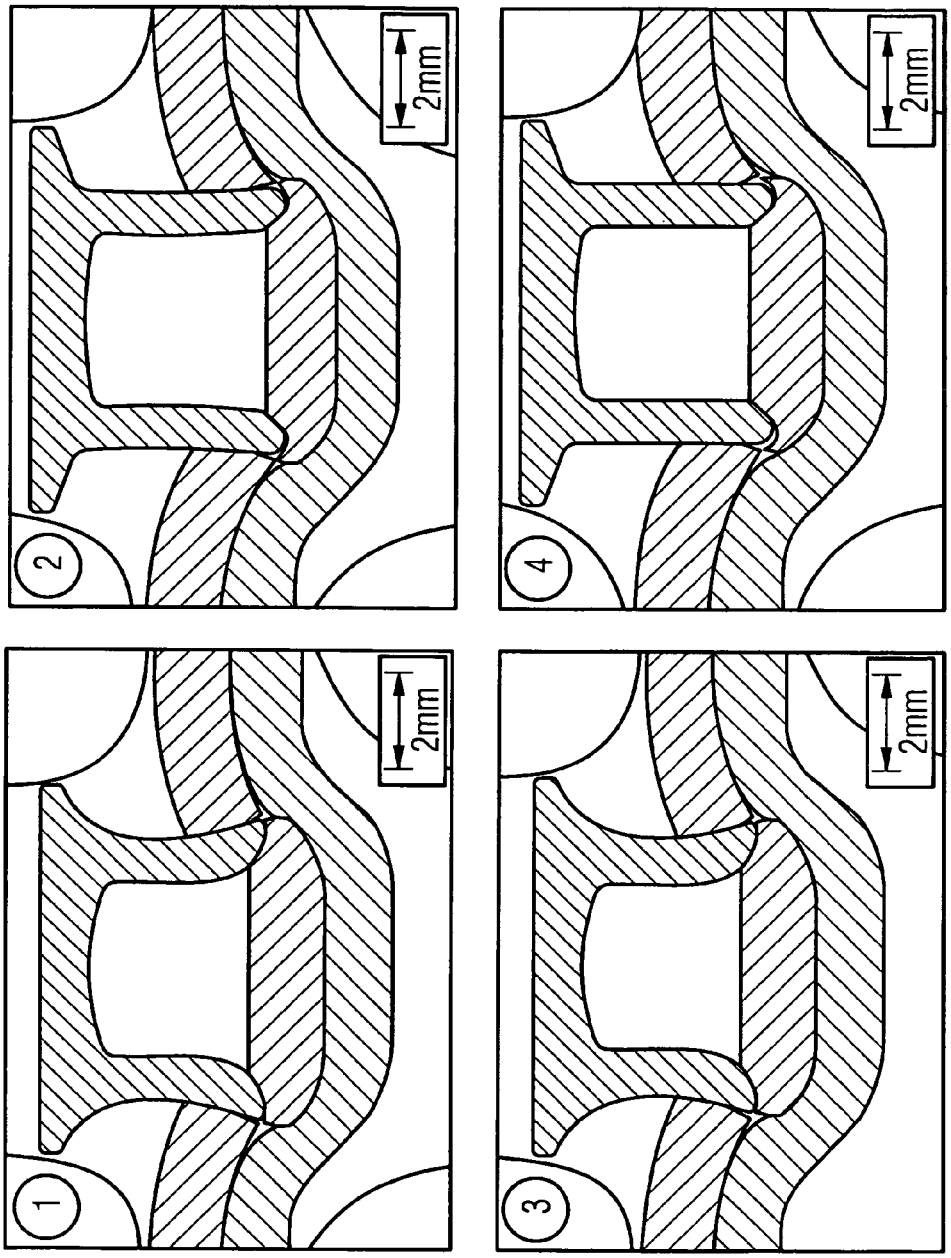
FIG. 2 shows sectional views in the production of a self-piercing rivet joint at the end of the piercing operation shortly before the penetration of the self-piercing rivet into the die side metal sheet, wherein the left side shows a conventional C rivet and the right side shows a self-piercing rivet designed according to the invention in accordance with FIG. 1.
Figure 3:
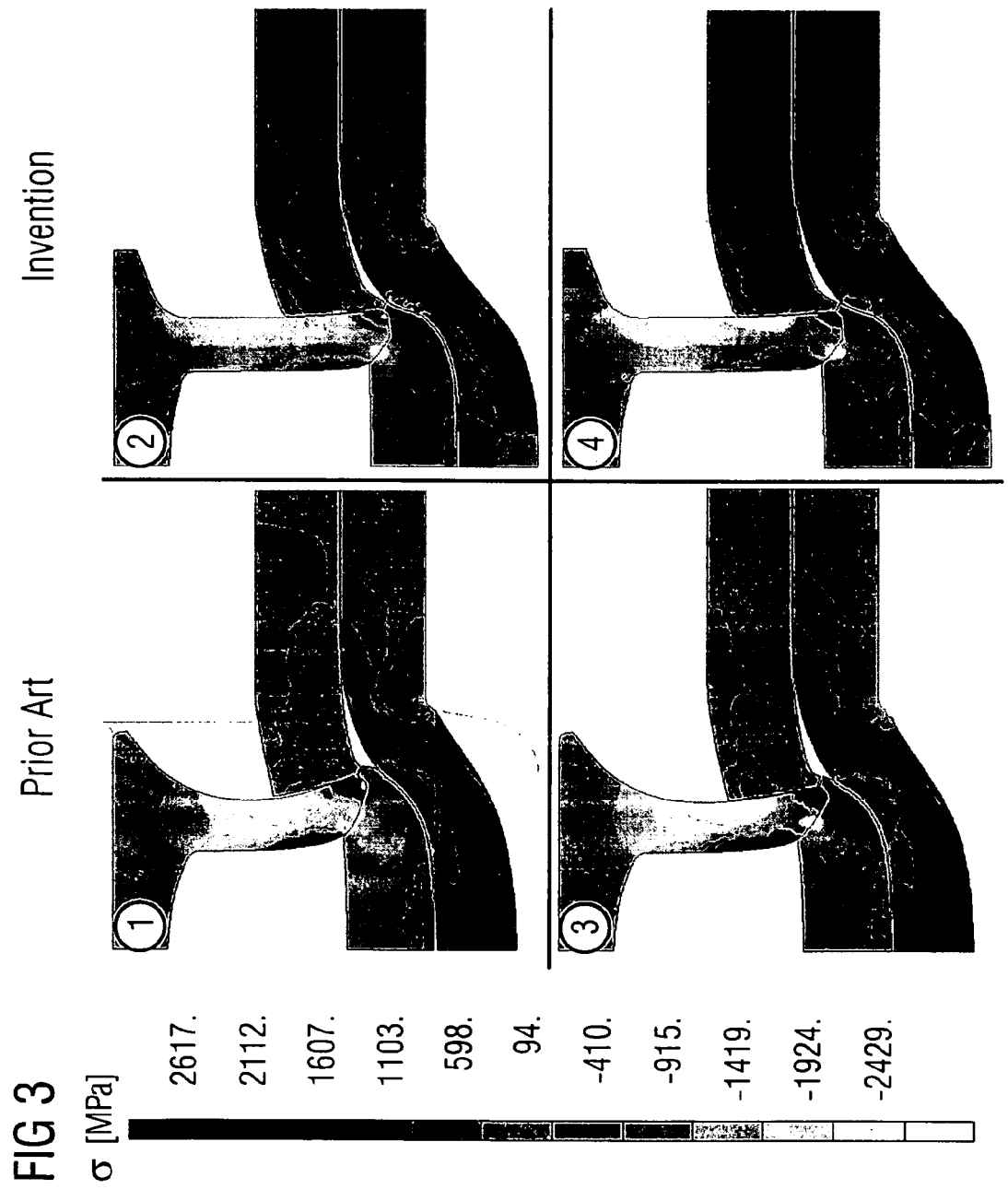
FIGS. 3, 4 show similar sectional views corresponding to FIG. 2, which however were determined with the help of FEM and in which the distribution of the greatest main stress (FIG. 3) and the degree of deformation (FIG. 4) in the self-piercing rivet and the self-piercing rivet joint are shown.
Figure 4:
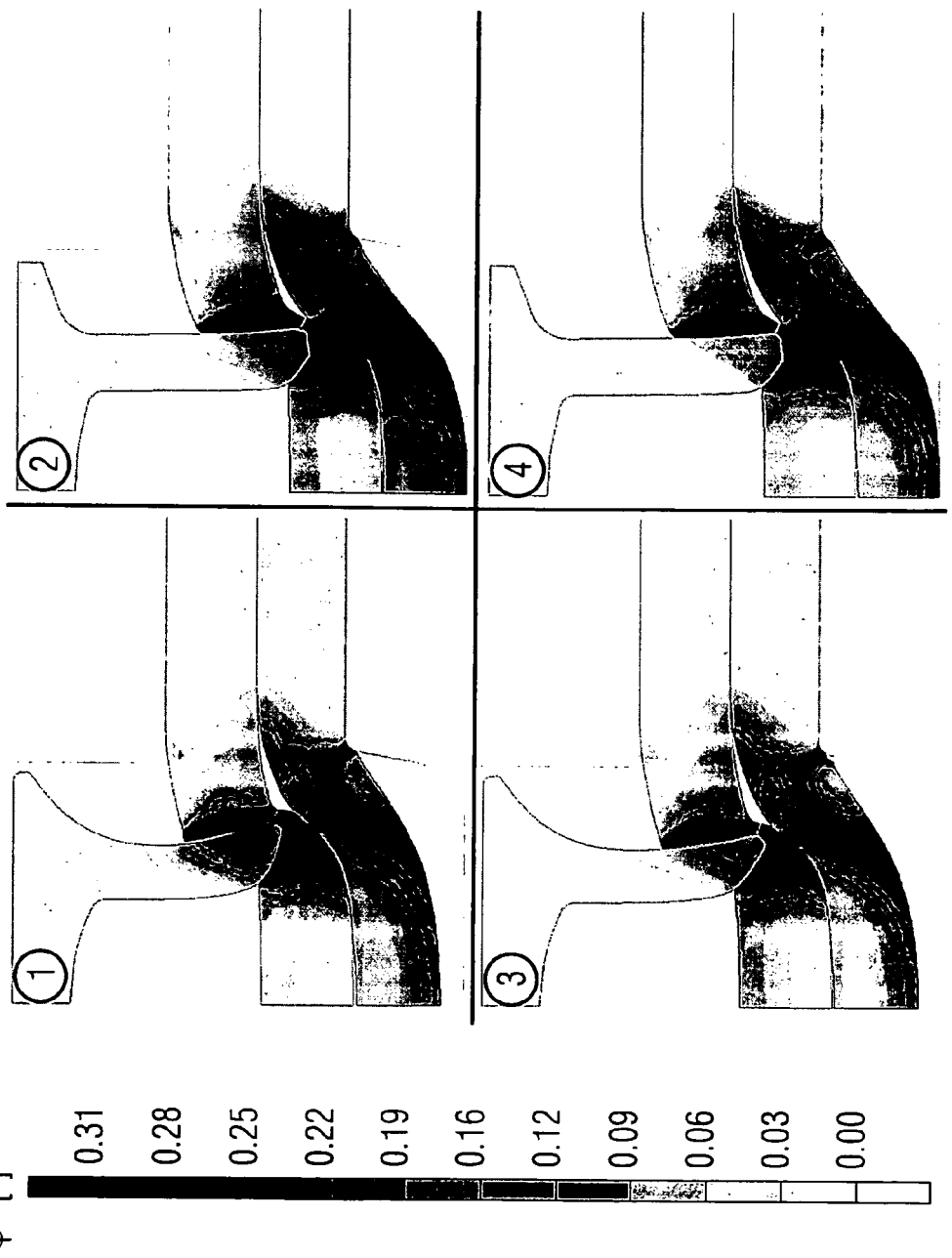

FIG. 2 shows sectional drawings created in the experiments marked with numerals 1 through 4, which represent the state after the cutting through of the punch side metal sheet and before the penetration of the self-piercing rivet into the die side metal sheet. FIGS. 3 and 4 show similar sectional drawings, which however were obtained with the help of FEM. The sectional draws marked 1 and 3 on the left side of FIGS. 2 through 4 relate to a conventional C rivet (EP 0 720 695), while the sectional drawings marked 2 and 4 on the right side of FIGS. 2 through 4 relate to a self-piercing rivet designed according to the invention in accordance with FIG. 1.

Both metal sheets were similar, i.e. they consisted of a high strength steel (HT800T), and they had a sheet thickness of 1.5 mm. The self-piercing rivets were made of a self-piercing rivet material of the hardness 6 (35B2) and of the hardness 7 (45B2), wherein the sectional views marked with numerals 1 and 2 relate to self-piercing rivets of hardness 6 and the sectional views marked with numerals 3 and 4 relate to self-piercing rivets of hardness 7.

As a comparison of the sectional views on the left and right side of FIG. 2 shows, the C rivet (state of the art) is already clearly expanded in the cutting process, while the self-piercing rivet according to the invention remains nearly unformed. The rivet according to the invention thus undergoes a straight-line, vertical cut, in contrast to the C rivet, in which case there is a diagonal cutting. The result is that the rivet shank of the self-piercing rivet designed according to the invention is subject to a nearly pure compression loading, whereas the rivet shank of the C rivet is subject to a non-uniform load (bending stress), i.e. is tensile loaded in the inside region and is pressure loaded in the outside region. In the sectional drawing marked with 3 it can be seen that the C rivet on the inside is already lacerated.

The above results are confirmed by the sectional drawings of FIG. 3 obtained by means of FEM, in which the distribution of the greatest main stress σ is indicated by differing shadings. By "greatest main stress", the greatest main stress according to amount is meant. The left side shading scale makes it clear that the tensile forces from bright to dark become increasingly greater, wherein negative tensile forces represent the compressive stresses and positive tensile forces represent the tensile stresses.

As a comparison of the left and right side of FIG. 3 shows, the distribution of stress in the rivet shank of the self-piercing rivet designed according to the invention is to the greatest extent uniform, while the distribution of stress in the C rivet is very much more non-uniform. In particular high compressive stress peaks are to be seen in the rivet shank of the C rivet on the outside and high tensile stress peaks can be seen on the inside, said tensile stress peaks originating from the bowing (expansion) of the rivet shank. In the C rivets distinctly greater stress gradients can be seen.

In the sectional drawings of FIG. 4 the degree of deformation φ is indicated by different shadings. Here too it can be clearly seen that the self-piercing rivet designed according to the invention on the right side of FIG. 4 at the end of the cutting process has only undergone a very slight deformation, whereas the C rivet is already severely deformed (expanded). While it is true that the deformation work, i.e. the energy to be applied, in the case of the self-piercing rivet designed according to the invention is not coercively less than is the case with the C rivet, a distinctly better piercing process ensues.

Figure 5:
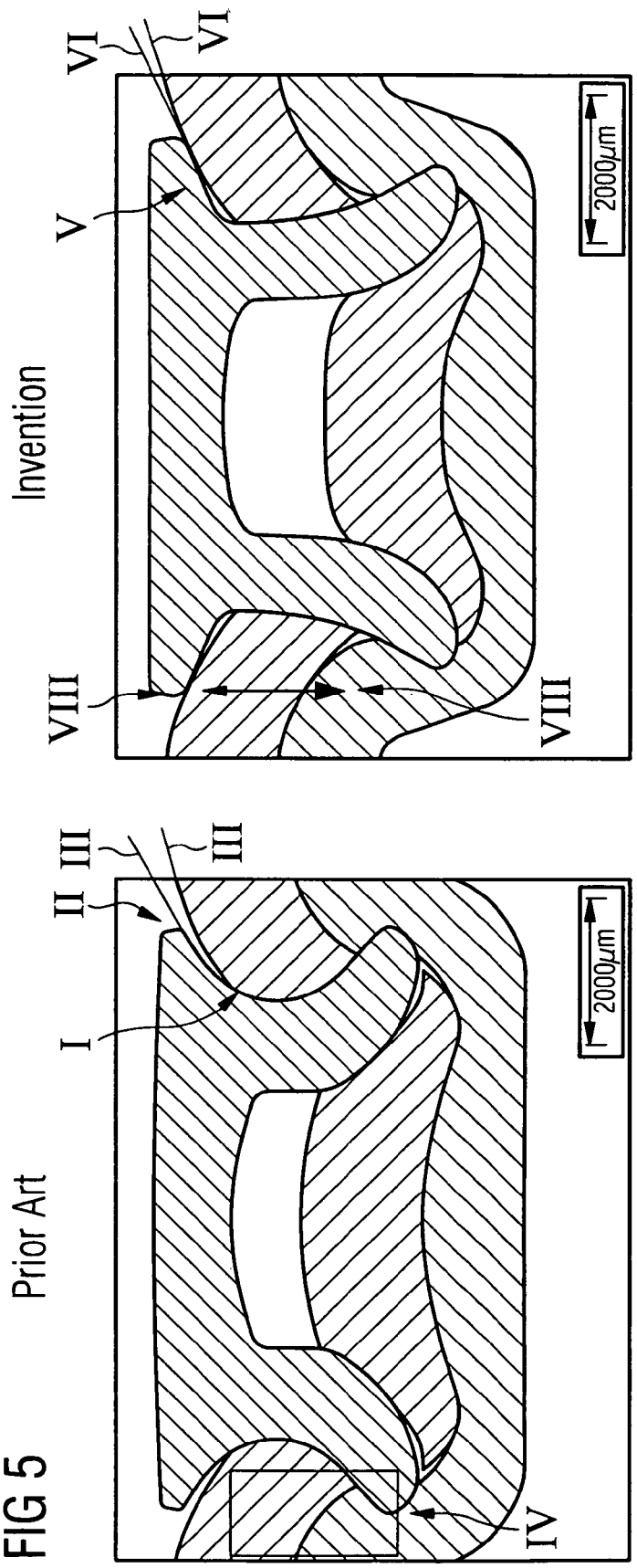
FIG. 5 shows sectional drawings of a finished self-piercing rivet joint, wherein the left side shows a conventional C rivet and the right side shows a self-piercing rivet designed according to the invention in accordance with FIG. 1.

Reference is now made to FIG. 5, which shows two sectional drawings of a finished self-piercing rivet joint between two metal sheets, wherein the left side relates to a conventional self-piercing rivet (C rivet) and the right side relates to a self-piercing rivet according to the invention (FIG. 1).

Since the self-piercing rivet designed according to the invention (right side of FIG. 5) does not expand until after the cutting through of the punch side metal sheet, a clean cutting edge of the punch side metal sheet forms. This results in an optimum contact surface of the upper metal sheet on the rivet shank after the setting process.

As indicated on the left side of FIG. 5 by the arrow I, a punctual placement begins at the C rivet between the punch side metal sheet and the rivet head already in the radius R 1 (FIG. 1), which in the setting process transitions to an areal load and unnecessarily increases the joint force. Moreover, in the setting process it results in a greater cracking in radial direction between the top side of the punch side metal sheet and the rivet head as shown by the arrow II and the lines III. The self-piercing rivet designed according to the invention on the right side of the FIG. 5 shows a distinctly different behavior. In the case of the self-piercing rivet designed according to the invention the punch side metal sheet does not come into contact with the underhead chamfer 118 (and not with the radius R 1) until quite late, the contact is not coercively areal (as a result of which the slight joint forces can be explained), and after the setting process a cracking between the rivet head and the punch side metal sheet ensues, which becomes radially greater from the outside to the inside and enables a punctual contact surface in the corrosion endangered region, see the arrow V and the two lines VI. The two underhead geometries differ substantially in the load displacement course for generation of the rivet head end position, the resulting tensile forces in the setting process, in the return forces of the self-piercing rivet joint after the setting process and the cracking between the rivet head and the punch side metal sheet after completion of the process.

An additional difference between the two self-piercing rivet joints on the left and right side of FIG. 5 can be seen in the region of the arrows IV and VIII. While in the case of the C rivet shown on the left side there is a severely distorted C rivet joint, in the case of the self-piercing rivet joint with the self-piercing rivet designed according to the invention there is a certain flexibility of the punch side metal sheet below the rivet head which enables a relative motion/a "setting" of the joint after removal of the tools. This "freedom of movement" acts positively on the return action of the metal sheets. One possible advantage is the resulting higher load bearing capacity of the self-piercing rivet joint under vibrating load, since a certain setting behavior of the metal sheet and with it of the self-piercing rivet joint enables a better homogeneity of the tensile forces in the set self-piercing rivet joint.

As a further advantage of the special underhead geometry the lower distortion of the joined metal sheets can be named, because the punch side metal sheet is not coercively radially displaced, as is the case with the C rivet. The undulation, which is evoked by the forming of the metal sheets, is reduced by the small underhead radius R 1 and the punctual placement of the rivet head on the punch side metal sheet, as a comparison of the left and right side of FIG. 5 shows.

Figure 6:
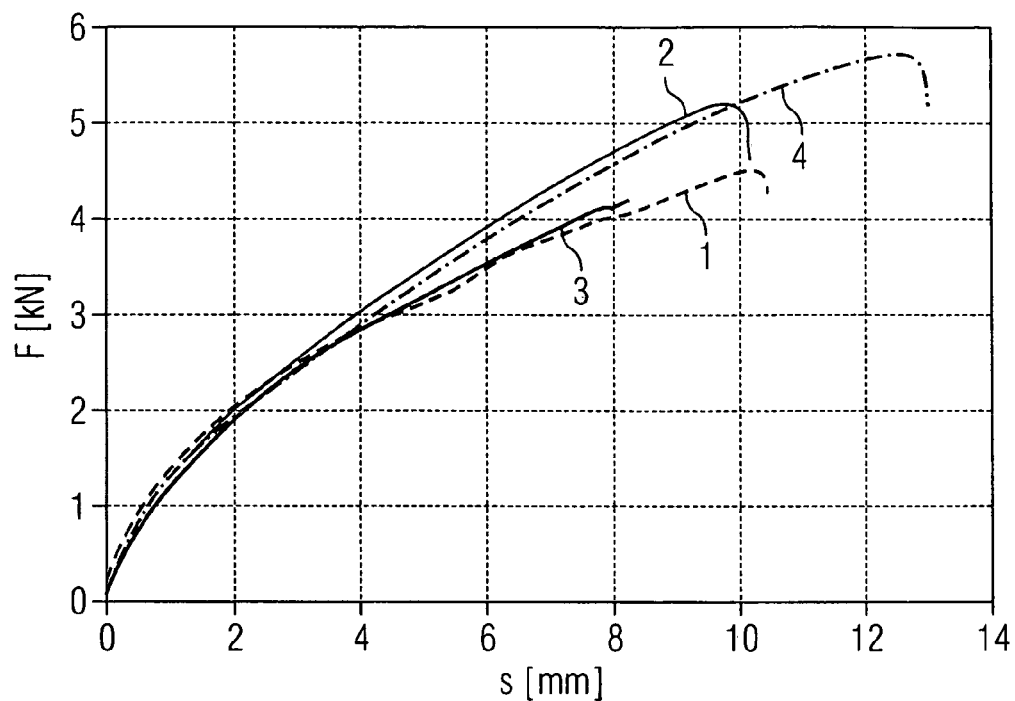
FIGS. 6, 7 show diagrams, in which the transferable standard force of a self-piercing rivet joint designed according to the invention is applied via the standard stroke in the case of shear tension loading (FIG. 6) or cross tension loading (FIG. 7), wherein it is a self-piercing rivet joint of similar type metal sheets.
Figure 7:
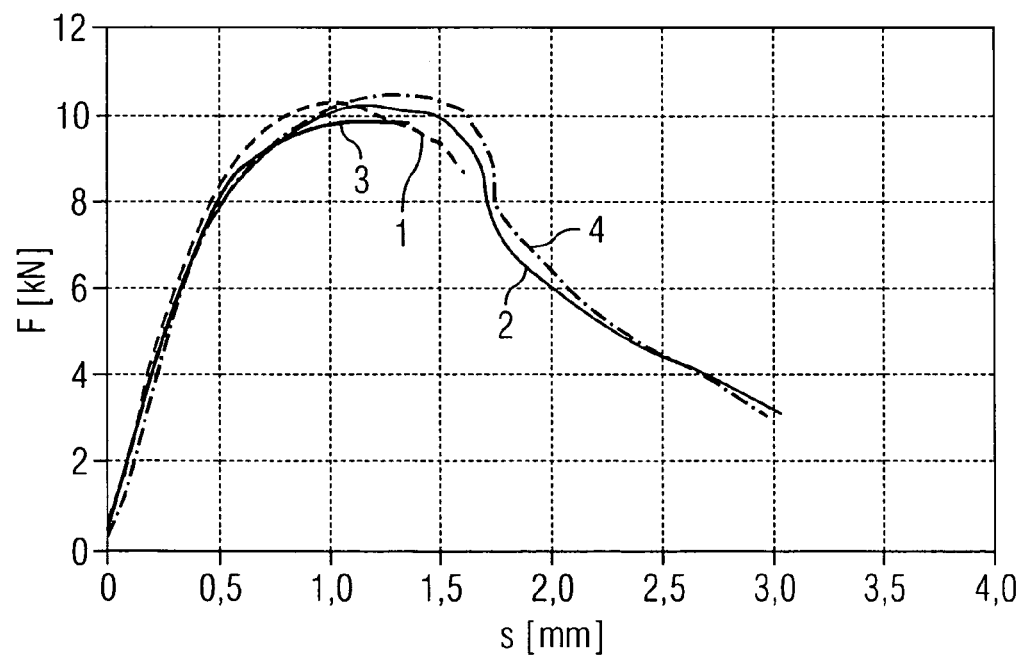

Self-piercing rivet joints with self-piercing rivets designed according to the invention were subjected to shear tension and cross tension tests. The results are shown in FIGS. 6-9, wherein the diagrams of FIGS. 6 and 7 are shown. The diagrams of FIGS. 6 and 7 relate to self-piercing rivet joints with similar metal sheets (steel/steel) as is the case with the tests of FIGS. 2-4, while the diagrams of FIGS. 7 and 8 relate to foreign metal sheets (aluminum/steel).

In the cross tension test the metal sheets of the self-piercing rivet joint are pulled apart in axial direction. The diagram of FIG. 6 shows the connection between the transferable force in this connection (standard force F) via the shifting of the metal sheets (standard path S) occurring in this connection. The curves marked 2 and 4 relate to self-piercing rivets according to the invention of the hardness 6 and 7 (as in FIGS. 2-4), while the curves marked 1 and 3 relate to C rivets of the hardness 6 and 7.

As can be inferred from FIG. 6, self-piercing rivet joints with self-piercing rivets designed according to the invention (curves 2 and 4) achieve distinctly higher standard forces than those with conventional C rivets. Moreover, the C rivets crack or shear relatively early, whereas the self-piercing rivets designed according to the invention do not fail. The self-piercing rivets designed according to the invention thus have a distinctly greater energy absorption capacity than the self-piercing rivets according to the state of the art.

In the shear tension test the metal sheets of the self-piercing rivet joint are pulled apart perpendicular to the rivet axis. The diagram of FIG. 7 shows that conventional C rivets (curves 1 and 3) crack or shear prematurely; this holds true in particular for self-piercing rivets of the hardness H 7, see Curve 3. The self-piercing rivets designed according to the invention (curves 2 and 4) on the other hand do not fail; they have a distinctly greater energy absorption capacity.

Figure 8:
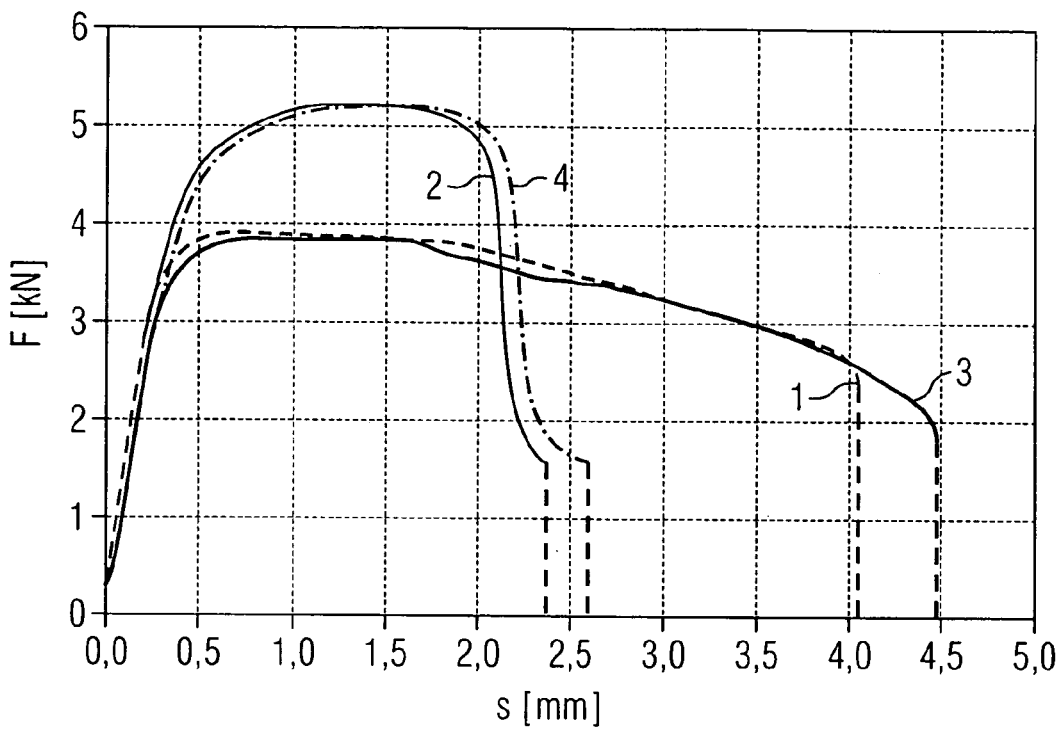
FIG. 8, 9 show diagrams corresponding to FIGS. 6 and 7, which however are for a self-piercing rivet joint made of dissimilar type metal sheets.
Figure 9:
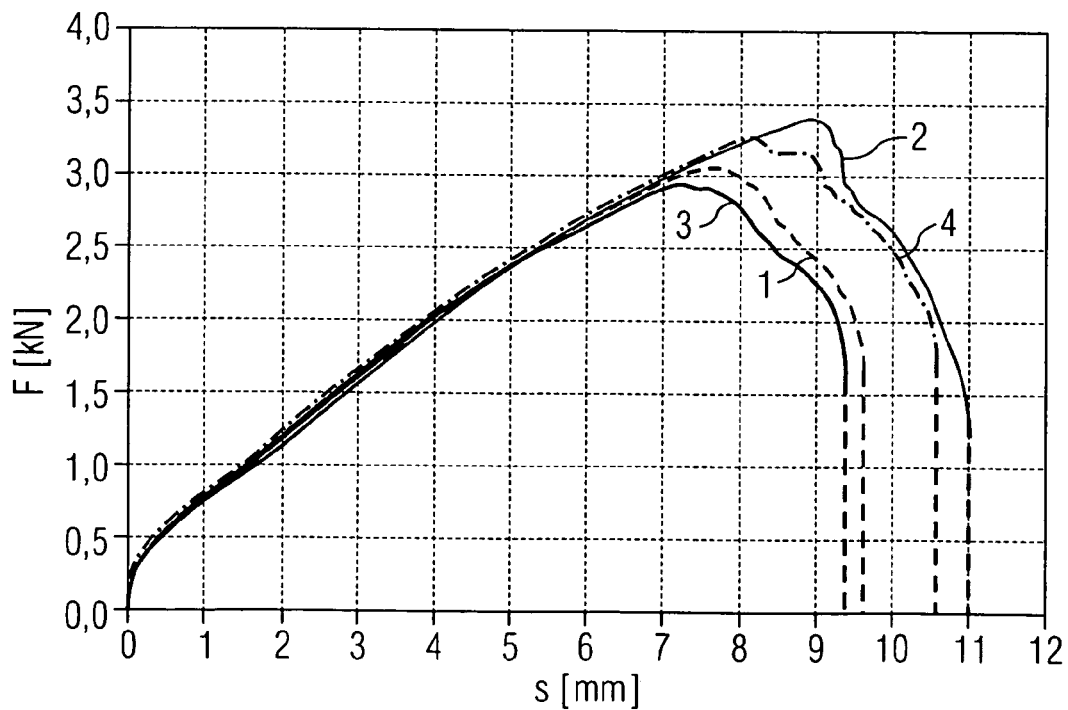
Figure 10:
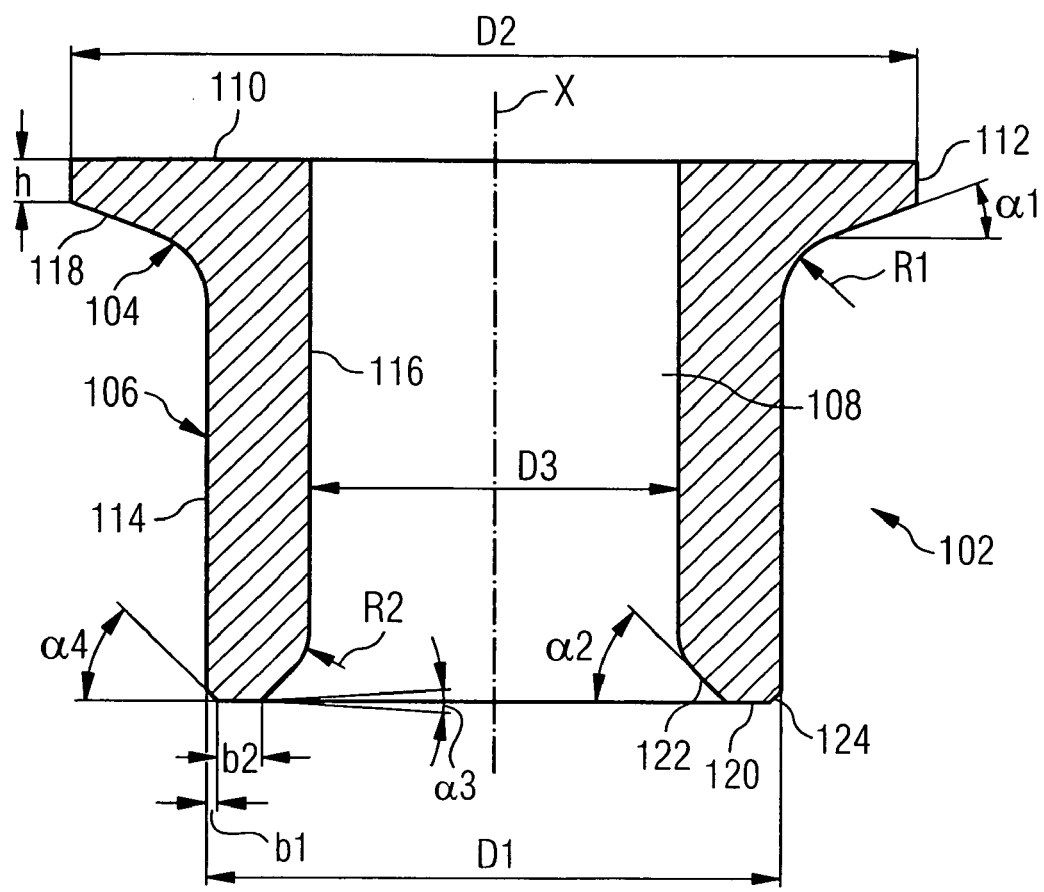
FIG. 10 shows an axial section corresponding to FIG. 1 through a hollow self-piercing rivet designed according to the invention.

FIGS. 8 and 9 show diagrams corresponding to FIGS. 7 and 6 which relate to self-piercing rivet joints from different type metal sheets (aluminum/steel). As FIG. 8 shows, in the case of self-piercing rivet joints with the self-piercing rivet designed according to the invention (curves 2 and 4) a maximum transferable tensile shear force in the magnitude of 5.2-5.3 kN is achieved. In contrast to this the maximum transferable tensile shear force in the case of the C rivet lies in the magnitude of less than 4 kN.

The cross tension tests yielded similar results, as the diagram of FIG. 9 shows. For example, the maximum transferable cross tension forces of self-piercing rivet joints with the self-piercing rivet designed according to the invention are ca. 0.3-0.7 kN greater than the corresponding values for the C rivet.

The tests and FEM investigations were performed with self-piercing rivets of the geometry shown in FIG. 1. These self-piercing rivets had the diameters, in particular normally used in the motor vehicle industry, of D1 (shank exterior 14) and D2 (head exterior 12) of 5.30 mm and 7.75 mm. However, it is understood that these diameters can be changed depending on the application. The angles $\alpha 1$, $\alpha 2$ and $\alpha 3$ would then remain the same, while the remaining dimensions can change in correspondence to the change of diameter.

As already mentioned, the self-piercing rivet designed according to the invention is in particular suitable for joining high strength steel materials (e.g., of a tensile strength RM>600 MPa), and it consists itself preferably of a high strength steel material. The self-piercing rivet can however also be used for the joining of metal sheets made of different materials (ductile/low strength materials), and the self-piercing rivet can also consist of other materials such as e.g. special steel, aluminum, alloys of these materials, ceramics etc.

It is also worth mentioning that in the case of the self-piercing rivet with the geometry shown in FIG. 1 a relatively bulk borehole 8 is created on the basis of the diameter D3 and the radii R3 and R4, which can hold the resulting cutting in the joining operation. This applies in particular in the case of joining metal sheets in which the punch side metal sheet is softer than the die side metal sheet, in which thus "soft is being joined to hard". However, it is also conceivable if rivets are produced out of aluminum and Al has to be joined with Al. Moreover, the radii R3 and R4 in the bore bottom 26 are optimally selected in the sense of a reduction of tension and adapted to production/fabrication conditions. The smooth transitions in the region of the radii R1, R2, R3 and R4 provide a "notch free" self-piercing rivet geometry, as a result of which the risk of cracking is further reduced.

FIG. 7 shows a modified exemplary embodiment of the invention, in which case the central hole 108 of the self-piercing rivet 102 is not constructed as a blind hole, but rather as a through bore. In other respects the geometry of the self-piercing rivet 102 of FIG. 7 is identical with that of the self-piercing rivet 2 of FIG. 1. Therefore in FIG. 7 the same designations are used for the angles, radii and dimensions h, b1, b2 as well as the same reference numbers, increased by 100, as used in FIG. 1.

With regard to the geometry of the full tubular self-piercing rivets 102 and the advantages attained as a result reference can be made to the description of the semihollow self-piercing rivet 2 of FIG. 1. Additionally, the following advantages and possibilities result in the case of the full tubular self-piercing rivet 102 of FIG. 7:

The distinctly greater bore volume in the interior of the rivet shank can—in particular in the case of the joining direction "soft to hard"—hold the material of the cutting. As a result the metal sheet material on the punch side can flow unhindered in the direction of the punch.

The risk of cracks in the shank interior is prevented, because no shank punches are enclosed.

The required joint force required is significantly reduced because the enclosed punch for the undercut formation (expanding of the self-piercing rivet) does not have to be displaced.

In the case of a given self-piercing rivet length (e.g. 5 mm) it is possible to process comparatively thick metal sheets on the punch side (2-3 mm) without jeopardizing the undercut formation.

All the geometric notches in the shank interior which can lead to distortion in the semihollow self-piercing rivet and in the most unfavorable case with it to cracks in the self-piercing rivet are omitted. The rivet shank can move more freely with the full tubular self-piercing rivet and as a result better "process" the stress in the joining operation.

The through bore of the full tubular self-piercing rivet can act positively on the (vibratory) load bearing performance of the self-piercing rivet joint, because the elastic-plastic clamping of the self-piercing rivet in the self-piercing rivet joint takes place more uniformly. The most rigid element in the self-piercing rivet joint, the self-piercing rivet, enables through the design as a full tubular self-piercing rivet a more homogeneous hardness/tension gradient in the self-piercing rivet joint.

In the exemplary embodiment of FIG. 7 the shank interior 116 limiting the through bore 108 is constructed continuously cylindrical from the radius R2. However, it is also possible that the through bore 108 in the head region transitions to an extension as shown by the exemplary embodiments of FIGS. 8 through 12.

The through bores 108*a* through 108*e* of the self-piercing rivets 102*a* through 102*e* in FIGS. 8 through 12 transition into extensions 130*a* through 130*e*, which are designed as conical areas. In the case of the self-piercing rivets of FIGS. 8 through 10 and 12 extensions 130*a*, 130*b*, 130*c* and 130*e* end in e.g., round or chamfered edges 132*a*, 132*b*, 132*c* and 132*e*, while in the case of the self-piercing rivets 102*d* of FIG. 11 the extension 130*d* ends in a radius 132*d*. In other respects the exemplary embodiments of FIGS. 8 through 12 differ only with regard to size and gradient of the conical extensions.

We claim:

1. A self-piercing rivet comprising a rivet head and a rivet shank with a central shank hole, which are all designed so as to be rotationally symmetrical with reference to a central axis, wherein the rivet head has a top side and a cylindrical head exterior surface of a predetermined head diameter, the rivet shank having an essentially cylindrical shank exterior surface and a cylindrical shank interior surface limiting the central shank hole, the head exterior surface and shank exterior surface being joined by a conical underhead chamfer and an underhead radius, which merges tangentially into the conical underhead chamfer and the shank exterior surface, wherein the conical underhead chamfer and a radial plane of the self-piercing rivet include an angle of 20°+5°/−5°, and the shank exterior surface and shank interior surface at the axial end remote from the rivet head being joined by a plane shank face, a conical shank inside chamfer and a shank end radius, of which the shank end radius merges tangentially into the shank interior surface and the conical shank inside chamfer, and the plane shank face is joined with the shank exterior surface by a cutting surface, the plane shank face and a radial plane of the self-piercing rivet including an angle of 0 −3°/+3° and the conical shank inside chamfer and a radial plane of the self-piercing rivet including an angle of 45°+10°/−5°.

2. The self-piercing rivet according to claim 1, wherein the radial width of the plane shank face is greater than 0.035 times the diameter of the shank exterior surface.

3. The self-piercing rivet according to claim 1, wherein the underhead radius is smaller than 0.30 times the diameter of the shank exterior surface.

4. The self-piercing rivet according to claim 1, wherein the cutting surface between the plane shank face and the shank exterior surface has a radial width of less than 0.1 mm.

5. The self-piercing rivet according to claim 1, wherein the head diameter is 7.75 mm+0.15 mm/−0.15 mm, the diameter of the shank exterior surface is 5.3 mm+0.1 mm/−0.15 mm, and the radial width of the plane shank face is 0.35 m+0.10 mm/−0.15 mm.

6. The self-piercing rivet according to claim 5, wherein the underhead radius is 0.67 mm+0.10 mm/−0.10 mm.

7. The self-piercing rivet according to claim 5, wherein the shank end radius is 0.70 mm+0.1 mm/−0.1 mm.

8. The self-piercing rivet according to claim 5, wherein the diameter of the shank interior surface is 3.40 mm+0.3 mm/−0.00 mm.

9. The self-piercing rivet according to claim 5, wherein the axial height of the head exterior is 0.40 mm+0.00 mm/−0.40 mm.

10. The self-piercing rivet according to claim 1, wherein it is a semihollow self-piercing rivet, the central hole being a blind hole.

11. The self-piercing rivet according to claim 10, wherein the hole bottom of the central hole exhibits a central radius and two lateral transition radii, of which the two transition radii each tangentially merge into the central radius and an adjoining shank inside wall.

12. The self-piercing rivet according to claim 10, wherein the central radius of the hole bottom is greater than 1.00 times the diameter of the shank exterior surface.

13. The self-piercing rivet according to claim 10, wherein a central radius of the hole bottom is 6.01 mm+0.10 mm/−0.10 mm.

14. The self-piercing rivet according to claim 13, wherein the two lateral transition radii of the hole bottom are 0.27 mm+0.05 mm/−0.05 mm.

15. The self-piercing rivet according to claim 10, wherein the axial height of the rivet head on the central axis is less than 1.00 mm.

16. The self-piercing rivet according to claim 1, wherein it is designed as a hollow self-piercing rivet, the central hole being a through hole.

17. The self-piercing rivet according to claim 16, wherein the shank interior surface is essentially designed cylindrically over the entire length of the central hole.

18. The self-piercing rivet according to claim 16, wherein the shank interior surface on the head end of the self-piercing rivet merges into an extension.

19. The self-piercing rivet according to claim 18, wherein the extension exhibits a conical extension surface.

20. The self-piercing rivet according to claim 19, wherein the conical extension merges into the shank interior surface via a corner or a radius.

* * * * *